United States Patent [19]

Senshu et al.

[11] Patent Number: 4,927,538
[45] Date of Patent: May 22, 1990

[54] PURIFICATION OF C.I. SOLVENT BLACK 3

[75] Inventors: Hisashi Senshu, Machida; Masahiro Otsuka, Osaka, both of Japan

[73] Assignee: Orient Chemical Industries, Ltd., Osaka, Japan

[21] Appl. No.: 344,372

[22] Filed: Apr. 28, 1989

[30] Foreign Application Priority Data

May 6, 1988 [JP] Japan .................. 63-110978

[51] Int. Cl.$^5$ ............................................ B01D 11/04
[52] U.S. Cl. .................................... 210/634; 210/669; 534/887
[58] Field of Search ............... 210/634, 663, 669, 774; 534/756, 887

[56] References Cited

U.S. PATENT DOCUMENTS 4,224,071 9/1980 Buell .................................. 534/887

Primary Examiner—Ivars Cintins

[57] ABSTRACT

The present invention provides a process for highly purifying C.I. Solvent Black 3 using specific aromatic hydrocarbons or petroleum hydrocarbons. The process comprises dissolving C.I. Solvent Black 3 represented by

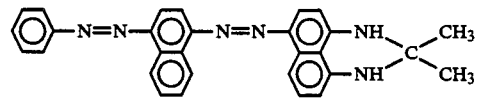

in an organic solvent selected from the group consisting of aromatic hydrocarbons having 6 to 12 carbon atoms and petroleum hydrocarbons having 6 to 10 carbon atoms followed by filtering, and then removing the solvent.

8 Claims, No Drawings

PURIFICATION OF C.I. SOLVENT BLACK 3

FIELD OF THE INVENTION

The present invention relates to a process for purifying C.I. Solvent Black 3 represented by the formula

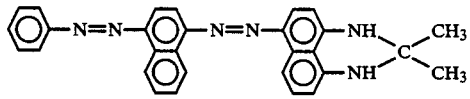

BACKGROUND OF THE INVENTION

C.I. Solvent Black 3 is an oil-soluble diazo dye stuff which is prepared by art-known methods. For example, it may be prepared by diazotizing aniline with naphthylamine followed by coupling with 2,2'-dimethyl-2,3-dihydropyrimidine. C.I. Solvent Black 3 is commercially available as Sudan Deep Black BB (BASF A. G.), Neptune Black (BASF A. G.), Oil Black BT (National Aniline Div. Alliee Chemical & Dye Corp.), Seles Black (Farbenfabriken Bayer A. G.) and Oil Black HBB (Orient Chemical Industries, Ltd.).

C.I. Solvent Black 3, however, contains unreacted components, by-products and impurities from reactants. These must be removed therefrom, in order for the end products, e.g. ink and the like, to be characterized with good properties.

Recently, safety to the human body has become more significant in the field of recording materials. In view of this point, non toxic or less toxic coloring agents are desired. Conventional C.I. Solvent Black 3 has a possibility of variation to microorganism, which is believed due to the impurities.

SUMMARY OF THE INVENTION

It has been found that, when a certain selected organic solvent is employed for purifying C.I. Solvent Black 3, impurities and other unnecessary materials, as well as toxic materials, can be removed.

The present invention provides a process for highly purifying C.I. Solvent Black 3 using specific aromatic hydrocarbons or petroleum hydrocarbons. The process comprises dissolving C.I. Solvent Black 3 represented by

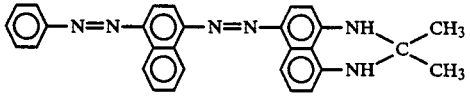

in an organic solvent selected from the group consisting of aromatic hydrocarbons having 6 to 12 carbon atoms and petroleum hydrocarbons having 6 to 10 carbon atoms followed by filtering, and then removing the solvent.

If alcoholic solvents which are conventionally used in purifying methods are employed for the process of the present invention, removal of impurities and other materials would be incomplete.

DETAILED DESCRIPTION OF THE INVENTION

The C.I. Solvent Black 3 employed in the present invention can be prepared by any of the methods known in the art. For example, it may be prepared by diazotizing a monoazo intermediate represented by

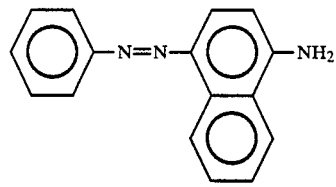

with amyl nitrite in an organic solvent and followed by coupling-reacting with 2,2'-dimethyl-2,3-dihydropyrimidine. Low purity reactants can be employed to obtain C.I. Solvent Black 3.

The organic solvent of the present invention can be the aromatic hydrocarbons having 6 to 12 carbon atoms, such as benzene, toluene, xylene, ethylbenzene, naphthalene, methylnaphthalene and the like. Xylene is preferred in view of toxicity, boiling points and economical reasons. The organic solvent can also be petroleum hydrocarbons having 6 to 10 carbon atoms, including aliphatic hydrocarbons, such as hexane, heptane, octane and nonane; alicyclic hydrocarbons, such as cyclohexane, ethylcyclohexane, decaline and tetralin; and the like. The organic solvent may be a mixture of the aromatic hydrocarbons, the petroleum hydrocarbons or both. The organic solvent can generally be selected based on its solubility to the dye. Accordingly, the aliphatic hydrocarbons may be admixed with the aromatic hydrocarbons in an amount of 10 to 30% by weight.

An amount of the organic solvent can be varied by the selection of the solvent, but generally be 5 to 20, preferably 10 to 15 in a ratio of a volume (ml) of the solvent to a weight (g) of the dye stuff.

The purifying process of the present invention is carried out by dissolving C.I. Solvent Black 3 in the organic solvent to form a solution, followed by filtering. The dissolving can be carried out at an elevated temperature to accelerate dissolving if necessary. Filtering is generally conducted at a low temperature, preferably at 0° to 30° C. It is more preferable to carry out the filtering after allowing the solution to stand for several days at a low temperature. The filtrate, which resulted from the filtering, is then subjected to distillation at a reduced pressure to recover the organic solvent and to obtain a tar purified product. The product is a tar at a temperature of over 40° C. and solid at a temperature of under 40° C.

In order to purify the C.I. Solvent Black 3 more completely, it is preferred that an absorbent is added to the filtrate before the distillation of the solution. Examples of the absorbents are active carbon, silica gel, alumina and the like. If active carbon is employed, it will absorb polar materials which are dissolved in the filtrate and thereby reduce toxicity. The absorbent can be removed from the filtrate by another filtering process.

The purified C.I. Solvent Black 3 of the present invention, which has substantially no impurities, is 2 to 3 times more soluble in various solvents than the dyestuff which has not been purified (the crude dyestuff), and it significantly reduces toxicity. The dyestuff of the present invention is very useful in heat sensitive transfer recording ink, type writer ribbon ink and as a coloring agent of molding resin for electronic elements.

EXAMPLES

The present invention is illustrated by the following Examples, which are not to be construed as limiting the present invention to their details.

Example 1

Seventy grams of crude C.I. Solvent Black 3 was dispersed in 700 ml of xylene and mixed at 80° to 100° C. for 4 hours. The mixture was cooled to room temperature and the insoluble materials were filtered off. The filtrate was then evaporated and xylene was recovered to obtain a tar product (62 g).

Example 2

Seventy grams of crude C.I. Solvent Black 3 was dispersed in 700 ml of xylene and mixed at 80° to 100° C. for 4 hours. The mixture was cooled to room temperature and the insoluble materials were filtered off. Active carbon was then added in an amount of 10% by weight of the crude dye stuffs and allowed to stand for 2 hours, followed by cooling to room temperature with stirring. The obtained solution was filtered and treated as generally described in Example 1 to obtain a tar product (60 g).

Example 3

Seventy grams of crude C.I. Solvent Black 3 was dispersed in 700 ml of xylene, to which active carbon was added in an amount of 10% by weight of the crude dye stuff and refluxed for one hour. It was then held at 80° to 100° C. for 3 hours and cooled to room temperature. The obtained solution was filtered and treated as generally described in Example 1 to obtain a tar product (62 g).

Example 4

Seventy grams of crude C.I. Solvent Black 3 was dispersed in 700 ml of a mixture of toluene and cyclohexane in a volume ratio of 70/30 (toluene/cyclohexane) and mixed at 80° to 100° C. for 4 hours. The mixture was cooled to room temperature and the insoluble materials were filtered off. Active carbon was then added in an amount of 10% by weight of the crude dye stuffs and refluxed for one hour. It was then allowed to stand at 80° to 100° C. for 4 hours and cooled to room temperature with stirring. The obtained solution was filtered and treated as generally described in Example 1 to obtain a tar product (61 g).

Experiment

The products of Examples 1 to 4 were subjected to an Aims test and the results are shown in Table 1. The Ames test was carried out using microorganism strain TA-98 to which can enzyme activity metabolism of chemical materials was added. The result is expressed by a magnification of colony number to control colony number. For comparison, dyestuffs which are commercially available were also subjected to the same test and the results are shown in Table 1.

TABLE 1

| Example numbers | Added amount | | |
|---|---|---|---|
| | 0.1 mg | 1.0 mg | 5.0 mg |
| 1 | 1.6 | 2.1 | 2.5 |
| 2 | 1.2 | 1.6 | 1.7 |
| 3 | 1.7 | 2.8 | 3.7 |
| 4 | 1.2 | 3.0 | 3.7 |
| Comparative Example A[1] | 1.5 | 7.1 | 13.0 |
| B[2] | 1.2 | 6.5 | 16.2 |
| C[3] | 1.2 | 9.3 | 21.3 |

[1] Oil Black HBB available from Orient Chemical Industries, Ltd.
[2] Sudan Deep Black BB available from BASF A. G.
[3] Neptune Black X-60 available from BASF A. G.

Solubility to various solvents was measured on the purified dye stuffs of Example 2 and Comparative Example 2. Fifteen g of dye was dissolved in 50 ml of a solvent and filtered with No. 2 filter paper. The filtrate weighed, and then the solvent was removed by distillation and the residue weighed. The solubility is expressed as a percentage of the residue weight divided by the filtrate weight. The results are shown in Table 2.

TABLE 2

| Solvent | Example 2 | Comparative Example A |
|---|---|---|
| Methanol | 2.2 | 1.0 |
| n-Butanol | 8.8 | 3.1 |
| Acetone | 28.6 | 10.5 |
| Cyclohexane | 25.3 | 10.5 |
| n-Hexane | 0.4 | 0.1 |
| Benzene | 25.1 | 9.4 |
| Toluene | 26.0 | 9.5 |
| Xylene | 26.3 | 9.5 |
| Ethyl acetate | 25.3 | 9.5 |
| Ethyleneglycol monoethyl ether | 23.5 | 8.9 |
| Methyl ethyl ketone | 28.2 | 12.1 |

What is claimed is:

1. A process for purifying C.I. Solvent Black 3 comprising dissolving C.I. Solvent Black 3 in an organic solvent selected from the group consisting of aromatic hydrocarbons having 6 to 12 carbon atoms, petroleum hydrocarbons having 6 to 10 carbon atoms and mixtures thereof to form a solution, filtering said solution, and removing said solvent from the filtrate resulting from the filtering.

2. The process according to claim 1 wherein after filtering said solution, an absorbent is added to the filtrate.

3. The process according to claim 2 wherein the absorbent is selected from the group consisting of active carbion, silica gel and alumina.

4. The process according to claim 1 wherein the aromatic hydrocarbon having 6 to 12 carbon atoms is selected from the group consisting of benzene, toluene, xylene, ethylbenzene, naphthalene and methylnaphthalene.

5. The process according to claim 1 wherein the organic solvent petroleum hydrocarbon having 6 to 10 carbon atoms is selected from the group consisting of hexane, heptane, octane, nonane, cyclohexane, ethylcyclohexane, decaline and tetralin.

6. The process according to claim 1 wherein, the organic solvent is present in a ratio (organic solvent volume (ml)/C.I. Solvent Black 3 weight (g)) of 5 to 20.

7. The process according to claim 1 wherein the dissolving is carried out at an elevated temperature of 80° to 100° C.

8. The process according to claim 1 wherein the filtering is conducted at 0° to 30° C.

* * * * *